United States Patent
Frangakis et al.

(10) Patent No.: US 12,462,275 B2
(45) Date of Patent: *Nov. 4, 2025

(54) METHOD OF ADVERTISING TO A TARGETED BUYER

(71) Applicant: Reveal Mobile, Inc., Raleigh, NC (US)

(72) Inventors: Jonathan Christian Frangakis, Jersey City, NJ (US); Gabriel Alan Frangakis, Stamford, CT (US)

(73) Assignee: Reveal Mobile, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,973

(22) Filed: Oct. 8, 2018

(65) Prior Publication Data

US 2019/0188754 A1 Jun. 20, 2019

Related U.S. Application Data

(63) Continuation of application No. 13/956,209, filed on Jul. 31, 2013, now Pat. No. 10,096,041.

(60) Provisional application No. 61/677,520, filed on Jul. 31, 2012.

(51) Int. Cl.
G06Q 30/00 (2023.01)
G06Q 30/0251 (2023.01)

(52) U.S. Cl.
CPC ..... *G06Q 30/0255* (2013.01); *G06Q 30/0261* (2013.01)

(58) Field of Classification Search
CPC .......... G06Q 30/0255; G06Q 30/0261; G06Q 30/0265; G06Q 30/0266; G06Q 30/0269
USPC .......... 705/14.53, 14.58, 14.62, 14.63, 14.66
See application file for complete search history.

(56) References Cited

U.S. PATENT DOCUMENTS

| | | | | |
|---|---|---|---|---|
| 6,795,707 | B2 * | 9/2004 | Martin ................. | G06Q 20/202 455/423 |
| 6,968,513 | B1 * | 11/2005 | Rinebold ............... | G06Q 30/02 715/854 |
| 7,672,937 | B2 * | 3/2010 | Madhavan ............. | G06Q 30/02 705/14.49 |
| 8,909,771 | B2 * | 12/2014 | Heath ..................... | G06Q 30/02 709/224 |
| 8,954,090 | B2 * | 2/2015 | Cochran ............... | H04W 4/029 455/456.1 |
| 9,183,572 | B2 * | 11/2015 | Brubaker ........... | G06Q 30/0266 |
| 9,710,821 | B2 * | 7/2017 | Heath ................ | G06Q 30/0222 |
| 10,096,033 | B2 * | 10/2018 | Heath .................... | G06Q 30/02 |

(Continued)

FOREIGN PATENT DOCUMENTS

| | | | | |
|---|---|---|---|---|
| JP | 2011065658 A | * | 3/2011 | ............. G06Q 30/02 |
| WO | WO-2007104237 A1 | * | 9/2007 | ............. G06Q 30/02 |

OTHER PUBLICATIONS

Lawson, Stephen. Ten Ways Your Smartphone Knows Where You Are. Apr. 6, 2012. https://www.pcworld.com/article/253354/ten_ways_your_smartphone_knows_where_you_are.html. Retrieved online May 12, 2018 (Year: 2012).*

(Continued)

*Primary Examiner* — James A Reagan
(74) *Attorney, Agent, or Firm* — Kristofer E. Elbing

(57) ABSTRACT

A method of advertising to a targeted consumer, via an application based consumer profiling algorithm which determines the interests of a consumer in a particular geographical position then queues relevant pre-loaded advertisements on an out-of-home (OOH) medium.

21 Claims, 3 Drawing Sheets

(56) References Cited

U.S. PATENT DOCUMENTS

| | | | | |
|---|---|---|---|---|
| 10,120,877 B2* | 11/2018 | Heath | | G06Q 50/01 |
| 10,127,563 B2* | 11/2018 | Heath | | G06Q 50/01 |
| 10,127,564 B2* | 11/2018 | Heath | | G06Q 50/01 |
| 10,129,211 B2* | 11/2018 | Heath | | G06Q 30/02 |
| 10,157,388 B2* | 12/2018 | Yopp | | G06Q 30/02 |
| 2003/0009385 A1* | 1/2003 | Tucciarone | | H04L 9/40 |
| | | | | 705/26.1 |
| 2006/0277098 A1* | 12/2006 | Chung | | G06Q 30/0267 |
| | | | | 705/14.69 |
| 2009/0063274 A1* | 3/2009 | Dublin, III | | G06Q 30/0245 |
| | | | | 705/14.1 |
| 2009/0089120 A1* | 4/2009 | Terui | | G06Q 30/0255 |
| | | | | 705/14.53 |
| 2009/0101706 A1* | 4/2009 | Boyd | | G06Q 30/02 |
| | | | | 235/380 |
| 2009/0299857 A1* | 12/2009 | Brubaker | | G06Q 30/0269 |
| | | | | 455/99 |
| 2010/0306249 A1* | 12/2010 | Hill | | G06F 16/9535 |
| | | | | 707/769 |
| 2011/0208575 A1* | 8/2011 | Bansal | | G06Q 30/02 |
| | | | | 709/248 |
| 2011/0258049 A1* | 10/2011 | Ramer | | G06Q 30/0273 |
| | | | | 705/14.66 |
| 2012/0016733 A1* | 1/2012 | Belvin | | G06Q 30/02 |
| | | | | 705/14.58 |
| 2012/0123877 A1* | 5/2012 | Buick | | G06Q 30/0253 |
| | | | | 705/14.73 |
| 2012/0143695 A1* | 6/2012 | Nandagopal | | G06Q 30/0251 |
| | | | | 705/14.66 |
| 2012/0209710 A1* | 8/2012 | Ramer | | G06Q 30/0273 |
| | | | | 705/14.51 |
| 2012/0265616 A1* | 10/2012 | Cao | | G09F 27/00 |
| | | | | 705/14.58 |
| 2012/0271883 A1* | 10/2012 | Montoya | | H04W 4/029 |
| | | | | 709/204 |
| 2013/0073336 A1* | 3/2013 | Heath | | G06Q 30/02 |
| | | | | 705/7.29 |
| 2013/0073387 A1* | 3/2013 | Heath | | G06Q 30/02 |
| | | | | 705/14.53 |
| 2013/0073388 A1* | 3/2013 | Heath | | G06Q 50/01 |
| | | | | 705/14.53 |
| 2013/0073389 A1* | 3/2013 | Heath | | G06Q 30/02 |
| | | | | 705/14.54 |
| 2013/0073400 A1* | 3/2013 | Heath | | G06Q 50/01 |
| | | | | 715/738 |
| 2013/0218677 A1* | 8/2013 | Yopp | | G06Q 30/02 |
| | | | | 705/14.66 |
| 2013/0268357 A1* | 10/2013 | Heath | | G06Q 10/10 |
| | | | | 726/26 |
| 2013/0317944 A1* | 11/2013 | Huang | | G01S 5/02521 |
| | | | | 455/457 |
| 2014/0006129 A1* | 1/2014 | Heath | | G06Q 30/02 |
| | | | | 705/14.23 |
| 2016/0140614 A1* | 5/2016 | Brubaker | | G06Q 30/0269 |
| | | | | 705/14.62 |
| 2017/0249673 A1* | 8/2017 | Vildaver | | G06F 3/14 |
| 2022/0108354 A1* | 4/2022 | Ramachandran | | G06Q 30/0261 |

OTHER PUBLICATIONS

• Lawson, Stephen. Ten Ways Your Smartphone Knows Where You Are. (Apr. 6, 2012). Retrieved online May 12, 2018. https://www.pcworld.com/article/253354/ten_ways_your_smartphone_knows_where_you_are.html. (Year: 2012).*

• King, Nancy J. Profiling the Mobile Customer—Privacy Concerns When Behavioural Advertisers Target Mobile Phones—Part I. ( Sep. 2010). Retrieved online Feb. 1, 2021. https://ir.library.oregonstate.edu/downloads/vh53ww39w (Year: 2010).*

• Google Ads Help. "Location Targeting." (Apr. 14, 2009). Retrieved online Apr. 13, 2022. https://support.google.com/google-ads/answer/6317?hl=en (Year: 2009).*

* cited by examiner

METHOD OF ADVERTISING TO A TARGETED BUYER

This application is a continuation of application Ser. No. 13/956,209, filed on Jul. 31, 2013, which claims the benefit of provisional application No. 61/677,520, filed on Jul. 31, 2012, and these applications are herein incorporated by reference.

TECHNICAL FIELD OF THE INVENTION

The present disclosure relates generally to a method of targeting consumers with relevant advertisements on OOH media

BACKGROUND OF THE INVENTION

Out-of-Home Media (OOHM) is commonly used to deliver marketing messages in advertisements to consumers driving or walking passed digital signage as well as individuals present in a particular area for an extended period, a captive audience. Currently, the content of these advertisements is directed towards any passer-by in anticipation that at least some will notice the advertisement and have a need for the product/service being marketed.

SUMMARY OF THE INVENTION

A method to advertise statistically relevant products and services to a targeted consumer is disclosed herein. The method involves identifying a consumer's interests based on browsing and retail history via a Smartphone based application. Pre-loaded advertisements stared within the OOHM processors will be queued based on the consumer's profile. Marketing entities will have the ability to determine interests that will queue marketing images and videos directed to the consumer whose interest align with the product or service being advertised. The number of targeted consumers that were geographically able to see a marketing entity's advertisements will be recorded and tracked for billing purposes. This method further involves offering market analytics and research to subscribing marketing entities.

BRIEF DESCRIPTION OF DRAWINGS

Features and advantages of the present disclosure will become apparent by reference to the following detailed description and drawings. It is to be understood that the system can work with other components that are not identical but can be substituted for a similar purpose to the component pictured and that method is disclosed herein as well. For the sake of brevity, components with previously described functions may or may not be described in connection with other drawings in which they appear.

DETAILED DESCRIPTION OF THE PREFERRED EMBODIMENTS

Examples of the method disclosed herein may be used to direct relevant OOHM (such as digital signage or gas station television) advertisements to targeted consumers that are geographically located in an area physically able to view the advertisement at the time of display, known as the advertisement's viewing area. In contrast to current OOHM advertising in which a single marketing message is displayed to all consumers who pass through the medium's viewing area, this advertising scheme will improve the efficiency of OOHM by displaying advertisements to consumers statistically shown to consider the product or service being marketed as relevant thus making the consumer a targeted buyer. This will be accomplished when the digital OOHM displays marketing images and videos in real time that are relevant to one or several consumers in the medium's viewing area.

Figure 1:
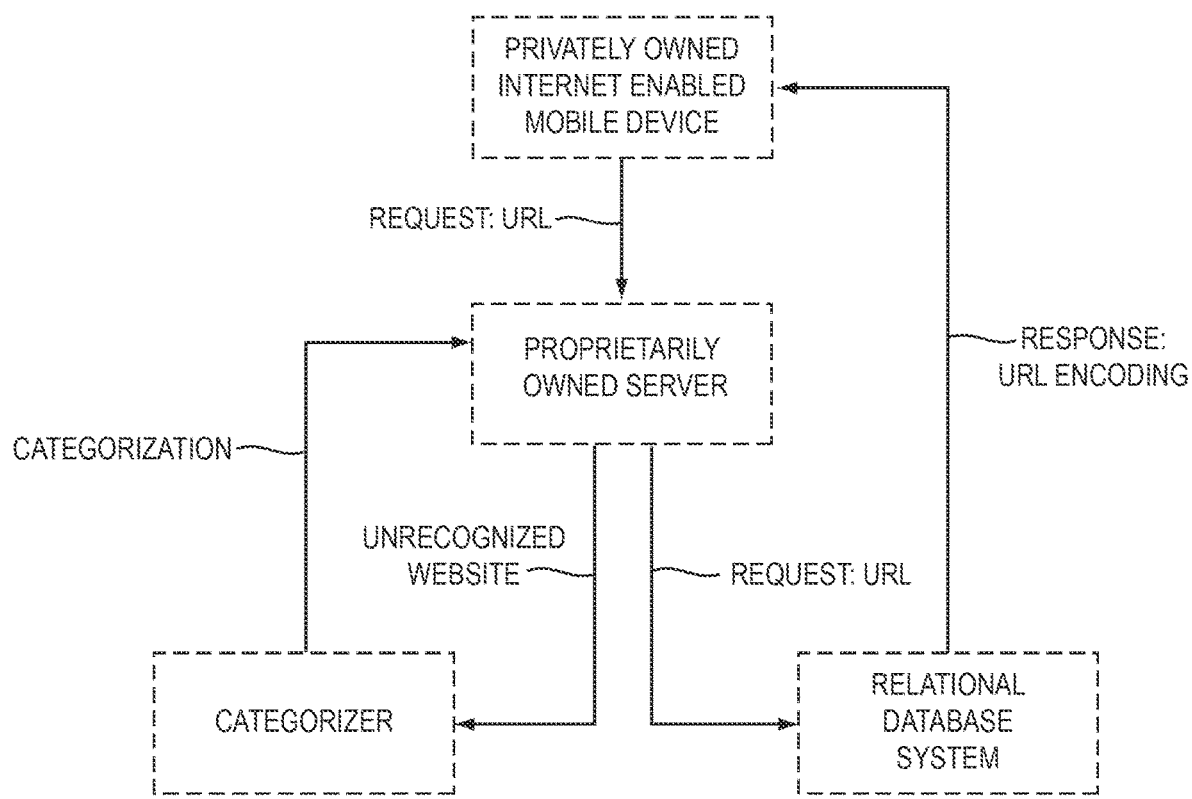
FIG. 1 is a schematic diagram depicting the method in which the invention will categorize websites in order to construct the Continuously Refining Online Genotype (CROG) necessary for the function of the invention.
Figure 2:
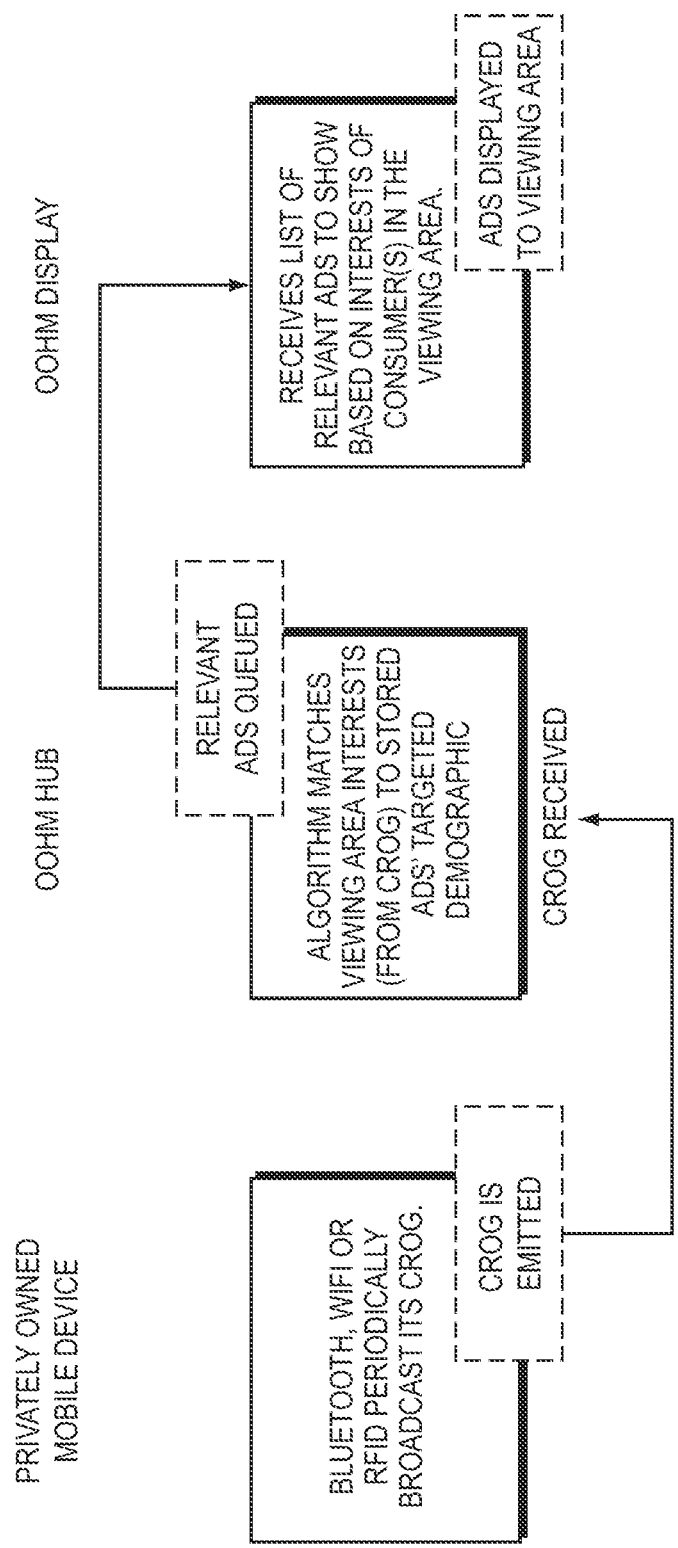
FIG. 2 is a schematic diagram depicting the method for advertising to a targeted buyer.
Figure 3:
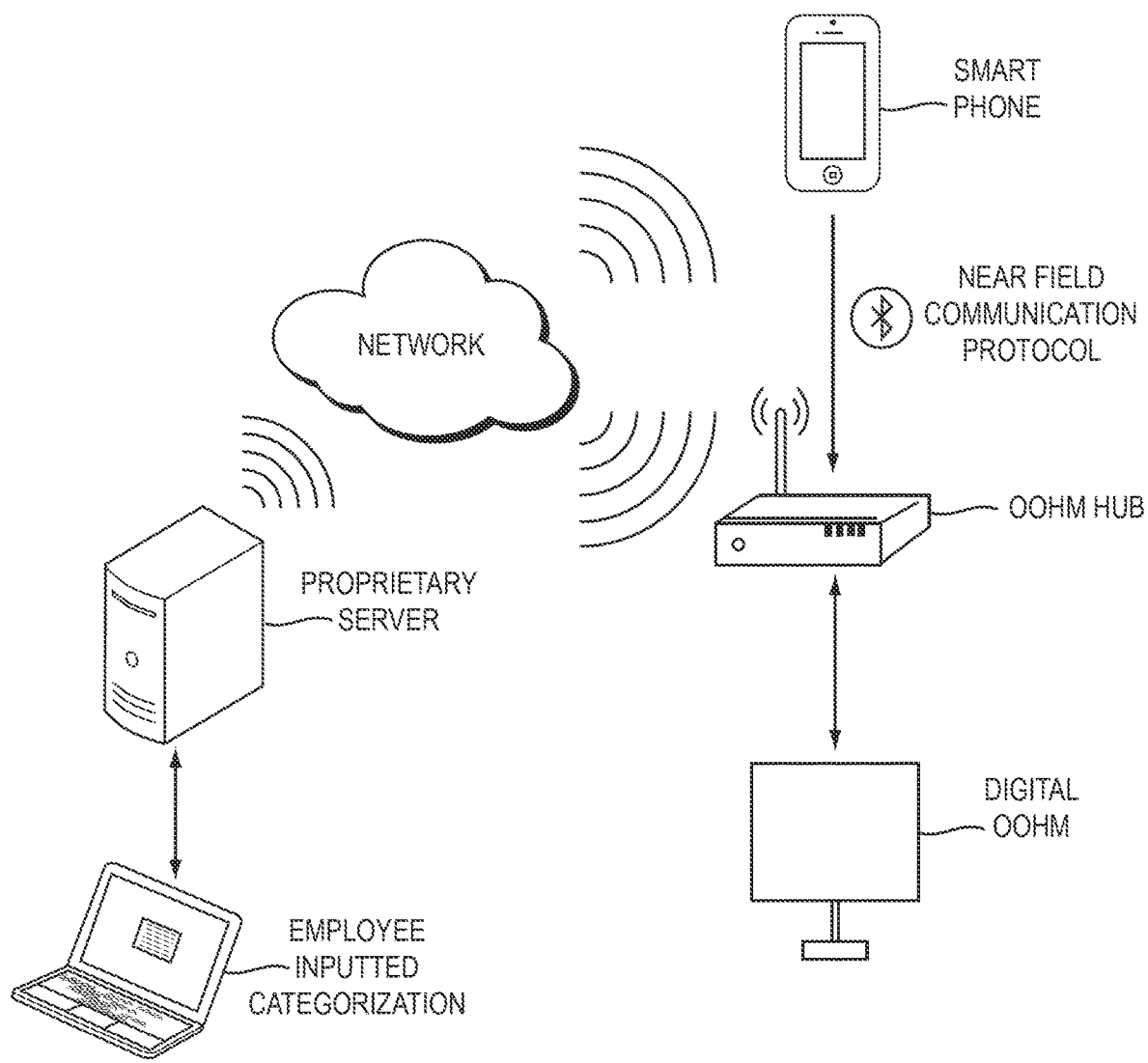
FIG. 3 is a schematic diagram depicting a system for advertising to a targeted buyer.

FIG. 1-3, described in detail below, depict a system designed to advertise to targeted buyers as defined by a marketing entity. In addition to a pre-existing carrier communication system (including but not limited one or more cell towers, one or more base stations and/or mobile switching centers, and one or more service providers), the system generally includes two key components; a cellular telephone (which could also be represented by a plurality of cellular telephones) with appropriate hardware and software to calculate and broadcast a Continuously Refining Online Genotype (CROG), and a digital OOH medium with appropriate hardware and software to receive a CROG from nearby cellular telephones (ping) and receive, store and queue marketing material based on received CROG input. It is to be understood, however, that additional components and/or systems not shown here could be employed in the method disclosed herein.

When a cellular telephone is properly equipped the user's web browsing and retail data will be collected and analyzed via an algorithm designed to develop the user's CROG, defined as a weighted identification number which constantly refreshes/refines and identifies an individual consumer based on his or her consumer and web-browsing habits. Each CROG is made up of characters in a predetermined order which reflect the web-browsing and purchasing habits of the user. An example of storing consumer data is as follows:

Position Description
1 Delineates Male (1) or Female (2)
2 2-digit age approximation of user
3 2-digit index code of most frequented website
4 1-digit relative value (0-9) of previous character associated with duration of current rank
5 2-digit index code of most frequented e-commerce site
6 1-digit relative value (0-9) of previous character associated with duration of current rank
7 2-digit index code of most commonly purchased product/service
8 1-digit relative value (0-9) of previous character associated with duration of current rank
9 2-digit index code of $2^{nd}$ most frequented website
10 1-digit relative value (0-9) of previous character associated with duration of current rank
11 2-digit index code of $2^{nd}$ most frequented e-commerce site
12 1-digit relative value (0-9) of previous character associated with duration of current rank
13 2-digit index code of $2^{nd}$ most commonly purchased product/service
14 1-digit relative value (0-9) of previous character associated with duration of current rank Should a lack of historical data exist, the CROG algorithm can 'zero-out' certain characters which are ignored by the OOHM in calculating relevant advertisements to display. It is understood that the system can operate without this function and that method is disclosed herein as ell. It also is to be understood other methods of storing consumer data as an identification number could be utilized, not limited to including different criteria and/or altered positions and are disclosed herein.

During off-peak hours, properly equipped digitally addressable OOHM will receive marketing material (images/GIFs and/or videos herein referred to as ads) from service center servers via a carrier communication network which are then stored in the OOHM internal storage unit. Each ad will have a predetermined targeted buyer based on CROG characteristics which the marketing entity requests to be set as a trigger for the ad. It is understood that the marketing entity could request the provider of the method disclosed in this patent to determine the triggers for a particular ad. Once all material is stored, a receiving and processing device within the OOHM, a hub, will begin receiving local CROG. Periodically, such as, for example, every 30 seconds, a consumer's device will emit its CROG via a short-range communication protocol. When an OOHM Hub receives this 'ping', it can be assumed that the bearer of the CROG is in the viewing area. With this information, the OOHM Hub can determine which ad to queue and display. It is understood that the system could also function in a manner in which the OOHM initiates contact with the cellular phone by requesting local CROG, intermittently or continuously. In an example, the ping device could request local CROG periodically, such as, for example, every ten milliseconds. It is understood that the request could also be initiated by motion sensor and/or other devices to alert OOHM of possible targeted buyers in the viewing area. In the same manner that the cellular telephone awaits the push of information (such as an incoming call or text message) it will also receive a ping requesting its user's CROG. Once a ping is received, it can be assumed that the bearer of this device is in the OOHM's viewing area and the device will broadcast its CROG fulfilling the OOHM's request. This method is disclosed herein.

For media viewable by multiple consumers, a Most Effective Advertisement (MEA) will be displayed which is calculated to be relevant to the largest number of consumers present.

If a conflict exists between two or more ads from a single consumer, meaning that a single CROG queues two or more ads based on different characters within, precedence will be given to higher (closer to the beginning) character positions. Further, advertising entities can request that particular ads be named featured advertisements thus giving them priority should a character in the CROG queue the ad regardless of its position.

If a conflict exists between two or more ads from multiple consumers, meaning that multiple CROG in a viewing area queue different ads, the digital OOHM's processor unit will establish a crowd genotype. Taking into account multiple CROG characters in numerous positions, the processor will calculate the MEA; the ad that would be considered as relevant to the most CROG in the viewing area. It is understood that the system can operate without resolving conflicts from single or multiple CROG and this is included in the disclosure.

Each time an ad is displayed, the digital OOHM's internal storage unit will record the number of CROG that were in the viewing area during the time the advertisement was displayed.

The software application included in the present invention is responsible for refreshing a consumer's CID by taking into account the consumer's web browsing habits. The following technical specification walks through the cycle that occurs when a consumer visits a new website.

Indexing Websites

As depicted in FIG. 1, the application will send a query to a proprietarily operated server, sending a URL and receiving back some encoding of the website. This can be done via queries to a relational database system (or other database system) such as mySQL. The database will be structured as what those familiar with the art call a "dictionary" meaning a set of key-value pairs. In this case, the key would be the request (the URL), and the value would be the response (the encoding). In its crudest form, the encoding of the URL could be an integer, with each website mapped to a unique integer or website category, for example, e-commerce websites. However, other encodings could be used, such as a form of byte-wise nested categorization, in which each byte of the response refers to a subcategory of the previous byte. It is to be understood that other encodings could be used to categorize or associate a website to an index and those methods are included herein.

While the request from the consumer only needs a website's encoding, every website must be categorized at a central server. When a website that has not been indexed is encountered, a request is sent to our server to visit and categorize the website. It is to be understood that this could be accomplished either by manual human entry or by automated webpage crawling, in which a piece of software would determine the best category for a site to be in depending on its content.

Refreshing CROG

Once the server has responded with the appropriate encoding of the visited website, there is no further need for the consumer's device to communicate with the proprietary servers directly. While the server computes the appropriate response in the previous step (Indexing Websites), it will temporarily recognize where the request originated in order to provide a response. After a response is sent, however, this information is lost. No record is stored of the URLs and/or the device IP addresses which speaks to the concern for anonymity and privacy.

The application on the phone is able to update the CROG on its own, without the need for further input from the server. The encoding of the website is inserted into the CROG, as is the level of visitation. The level of visitation is computed relative to other levels of visitation already existing in the CROG is based on how many times the website was accessed and how recently it was accessed. The phone-based application will utilize an algorithm that takes the old CROG, with the encodings of websites and levels of visitation, and computes new levels of visitation for all websites (including the newly visited websites which required server indexing) based on how many times a website was accessed and how recently it was accessed. As a CROG refreshes, websites that have been visited with less frequency can have their absolute level of visitation diminished before computing a relative level with the notion that staler data is not as useful.

Showing Ads

With the up-to-date CROG now implanted on the consumer's device, content must now be delivered to the consumer via OOHM. Periodically, such as, for example, every 30 seconds the consumer's device will emit its CROG via a short-range communication protocol, such as, for example, Bluetooth, Wi-Fi or Near Field Communication (NFC). Power to the device's Bluetooth and or Wi-Fi need only be turned on for a brief amount of time, as the data being sent is relatively compact. Thus, this process is not costly to the device's resources. Placed in various locations are hubs connected to digital OOHM that are capable of receiving these particular wireless signals. As depicted in FIG. 2, after collecting one or multiple CROG, the hubs then build a queue of advertisements to display on the OOHM. The queue is constructed by choosing an appropriate advertisement not only by matching website indices to ads, but also accounting for the importance of an ad. The importance of an ad is calculated by taking into account a) the number of people to which the ad is relevant and b) the individual importance of this ad to each person, which amounts to specifying an objective function to which the CROG of the consumers in the hub's immediate vicinity are inputs, and maximizing this objective function. A crude example of this would be a sum of the relative levels of visitation over all websites to which each ad pertains, aggregated over all the consumers. Thus, the hub is able to find which ads would not only be relevant to the most number of people, but also how relevant they are to the demographic.

From these values, all the ads the hub is able to show can be indexed by the ad's "score" according to the previously mentioned objective function. The ads are then placed into a simple priority queue, essentially a list that has been sorted by the ads' score (higher score corresponds to higher priority in the list). The hub then begins showing these ads in order, removing them from the list as they are shown, and periodically refreshing its priority queue. It is to be understood that implementing different behaviors once the priority queue is in place, such as displaying a certain ad for a longer amount of time if it is more important than other ads in the queue, is disclosed herein.

What is claimed is:

1. A digital advertising method, comprising:
presenting a series of advertisements on a digital screen of a first digital out-of-home media device at the location of the first digital out-of-home media device, wherein the advertisements are directed to targeted consumers,
communicating electronically with a smartphone-based application on a smartphone belonging to each of a plurality of consumers, wherein the smartphones belonging to the consumers are different from the first digital out-of-home media device, wherein the communicating takes place with at least some of the consumers while walking and wherein the communicating takes place with at least some of the consumers while driving,
associating a digitally stored reference number with each of the plurality of consumers through their smartphone applications, wherein the associating a stored reference number maintains the anonymity of the consumer,
wherein the communicating and associating specify whether the con geographically located in an area while maintaining their anonymity,
electronically recording and tracking a number of the targeted consumers that were geographically able to see a subscribing marketing entity's advertisements presented in the step of presenting, and
wherein a transmission from consumers devices via a communication protocol precedes the step of electronically recording and tracking a number of the targeted consumers that were geographically able to see a subscribing marketing entity's advertisements presented in the step of presenting.

2. The method of claim 1 wherein the step of recording and tracking is performed for billing purposes.

3. The method of claim 1 further including offering market analytics and research to the subscribing marketing entities.

4. The method of claim 1 wherein the first digital out-of-home media device includes digital signage.

5. The method of claim 1 wherein the first digital out-of-home media device includes digital Taxi TV.

6. The method of claim 5 further including collecting and analyzing consumer web browsing data for the plurality of consumers.

7. The method of claim 5 further including collecting and analyzing consumer purchasing data for the plurality of consumers.

8. The method of claim 5 further including collecting and analyzing consumer retail data for the plurality of consumers.

9. The method of claim 5 wherein the method further comprises continuously refreshing and refining the reference number based on information received about the web user's continuously changing history of web activity.

10. The method of claim 1 wherein a ping is received to determine that a consumer is in the viewing area.

11. The method of claim 1 wherein the step of communicating with a smartphone-based application takes place wirelessly.

12. The method of claim 1 wherein the reference number is made up of characters in a predetermined order which reflect the web-browsing of the user.

13. The method of claim 1 further including collecting and analyzing consumer data for the plurality of consumers.

14. The method of claim 1 wherein the step of associating a reference number associates a genotype reference number that is based on both online browsing and retail purchasing habits as the reference number.

15. The method of claim 1 wherein the step of associating a reference number associates an identification number as the reference number.

16. The method of claim 1 wherein the method further comprises deleting all history of previous reference numbers.

17. The method of claim 1 further including a step of intermittently receiving and storing advertisements by the first digital out-of-home media device from a server via a common carrier network.

18. The method of claim 1 wherein the method further comprises resolving conflicts based on a plurality of characters corresponding to the web user's online habits within the reference number, by accounting for importance of the individual characters within the reference number and according priority to advertisers based upon payment for featured presentation.

19. The method of claim 1 further including:
presenting advertisements on a digital screen of a second digital out-of-home media device at the location of the second digital out-of-home media device, wherein the advertisements are directed to targeted consumers,
communicating with a smartphone-based application on a smartphone belonging to each of a plurality of consumers, wherein the smartphones belonging to the consumers are different from the second digital out-of-home media device, wherein the communicating takes place with at least some of the consumers while walking and wherein the communicating takes place with at least some of the consumers while driving, associating a reference number with each of the plurality of consumers through their smartphone applications, wherein the associating a stored reference number maintains the anonymity of the consumer, and recording and tracking a number of the targeted consumers that were geographically able to see a marketing entity's advertisements presented in the step of presenting at the location of a second digital out-of-home media device.

20. The method of claim 1 wherein the smartphone-based application reports that a consumer is in the viewing area on its own schedule.

21. The method of claim 1 wherein the smartphone-based application reports that a consumer is in the viewing area independent of user input.

* * * * *